2,811,544

METHINE DYESTUFFS

Nicholas J. Kartinos, Niles, Ill., assignor to General Aniline & Film Corporation, New York, N. Y., a corporation of Delaware No Drawing. Application March 23, 1956, Serial No. 573,327

6 Claims. (Cl. 260—465)

This invention relates to a new class of dyestuffs which dye synthetic fibers, and in particular cellulose carboxylic acid ester fibers with outstanding wash- and light-fastness, and in addition, said dyestuffs are possessed of unusual and unexpected tinctorial strength as compared to other similar methine dyes.

I have discovered that the methine dyes obtained by condensing cyanoethyl cyanoacetate with a particular class of N-substituted p-aminobenzaldehydes in the presence of a basic catalyst are outstanding in so far as their light- and wash-fastness are concerned and, further, exhibit superior properties with respect to decreased sublimation and increased tinctorial strength. The dyestuffs of this invention yield in general exceptionally bright yellow or greenish-yellow dyeings on synthetic fibers and especially on cellulose acetates.

The methine dyes of this invention are characterized by the following general formula:

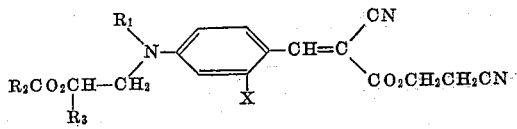

wherein $R_1$ may be aralkyl or lower alkyl of from 1 to 6 carbon atoms, substituted alkyl such as hydroxyalkyl, for example, hydroxyethyl, hydroxypropyl and the like, haloalkyl, for example, chloroethyl and the like, alkoxyalkyl, for example, methoxyethyl, and cyanoalkyl, for example, cyanoethyl. Additionally, $R_1$ may be equivalent to the groupings

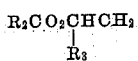

$R_2$ represents a lower alkyl radical, for example, methyl, ethyl, n-propyl, isopropyl, n-butyl, isobutyl and the like; $R_3$ may be hydrogen, lower alkyl such as methyl, ethyl and the like, or acyloxymethyl; and X may be hydrogen or lower alkyl such as methyl, ethyl and the like.

The intermediate cyanoethyl cyanoacetate may be prepared in accordance with a method described in copending application Serial No. 556,383 filed December 30, 1955. The following will serve to illustrate one of the methods described in the aforementioned application.

*Example A*

Into a 2-liter flask are charged:

340 g. cyanoacetic acid (4 moles)
355 g. ethylene cyanohydrin (5 moles)
600 g. chloroform
20 g. methane sulfonic acid The contents are then heated under reflux with a water separator until no more water separates. The reaction mixture is cooled to about 50° C. and then extracted with a dilute solution of sodium hydroxide until no acid remains in the chloroform solution. This solution is then dried over sodium sulfate, filtered and the chloroform then removed by distillation. The residue is then distilled under reduced pressure. The resultant colorless cyanoethyl cyanoacetate has a boiling point of 182–190° C. at 1.7 mm.

The N-substituted p-aminobenzaldehyde derivatives suitable for use in the preparation of the methine dyes of this invention include the following:

$\beta,\beta'$-(4-formylphenyl)-imino-bis-ethyl acetate

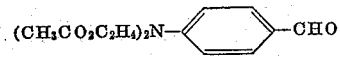

$\beta,\beta'$-(4-formyl phenyl)-imino bis-ethyl propionate

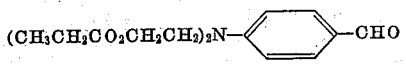

$\beta,\beta'$ - (3 - methyl - 4 - formylphenyl) - imino - bis - ethyl propionate

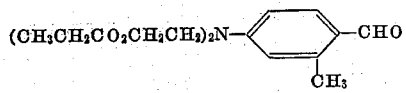

N-ethyl-$\beta$-(4-formylphenyl)-amino ethyl acetate

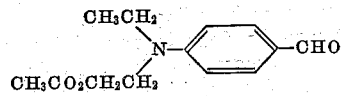

N-ethyl-$\beta$-(4-formylphenyl)-aminoethyl propionate

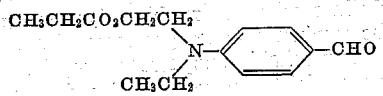

N - ethyl - $\beta$ - (3 - methyl - 4 -formylphenyl) - aminoethyl propionate

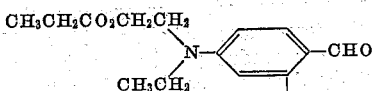

(N-methyl)-N-(4-formylphenyl)-aminoisopropyl acetate

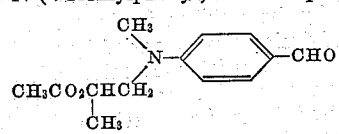

3 - (N - methyl)-N-(4-formylphenyl)-aminopropanediol diacetate-1,2

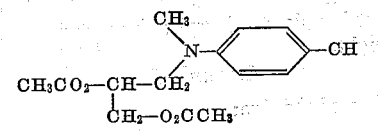

2 - N - ($\beta$ - chloroethyl) - N - (4 - formylphenyl)-aminoethyl acetate

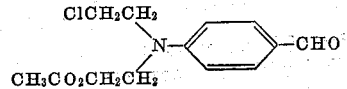

$\beta$ - N - ($\beta'$ - methoxyethyl) - N - (4 - formylphenyl)-aminoethyl acetate

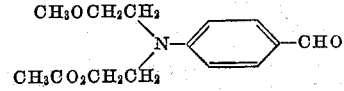

All of the foregoing aldehydes are readily prepared by reacting the appropriately substituted aniline with dimethyl formamide. Typical processes employing the use of phosphorus oxychloride are illustrated in the working examples below. The general procedure for the formation of the methine dyes of this invention follows well-established procedures and involves the interaction of the two intermediates, that is, the cyanoethyl cyanoacetate and n-substituted p-aminobenzaldehyde in the presence of a basic catalyst such as sodium acetate, sodium bicarbonate, sodium carbonate, tertiary amines such as pyridine, piperidine and the like. The process may be conducted in the presence of a non-interfering solvent or diluent such as chloroform, aromatic hydrocarbons such as benzene, toluene, and the like, alcohols such as methanol, ethanol, and the like, etc.

The new methine dyes prepared in accordance with this invention are essentially water-insoluble compounds which may be employed either in aqueous dyebaths or in organic solvent solutions to effect dyeings on the material undergoing coloration. In aqueous dyebaths the dyestuff is present as a dispersion or suspension and such dispersions or suspensions may readily be obtained by several different techniques. Thus the dyestuff may be dissolved in a small amount of solvent such as acetone or alcohol to which an additional small amount of a wetting agent has been added. The resultant solution is then drowned in hot water resulting in the dyestuff dispersion. An alternative technique involves grinding the dyestuff to a paste in the presence of a suitable dispersing agent such as a sulfonated oil, soap, sodium lignin sulfonate, sodium n-methyl, n-oleyl, n-taurate, formaldehyde condensation products with naphthalene sulfonic acids, known ionics such as polyoxyethylated phenols, alcohols and fatty acids, etc. The grinding or kneading of the dyestuff and dispersing agent may be done in any of the mixers well known for such purposes as, for example, a Werner-Pfleiderer mixer. The resulting paste may be used directly or dried, ground, and safely stored for later use.

Direct dyeings with the methine dyes of this invention may be conducted at temperatures of about 70° to 90° C., but any suitable temperature may be employed. The textile material to be dyed or colored, e. g. cellulose acetate, is ordinarily added to the dye bath at a lower temperature than that at which the main portion of the dyeing is to be conducted. For example, the fabric is introduced at a temperature of about 45° to 55° C., then the temperature is gradually raised to that selected for carrying out the dyeing operation. The temperature at which the dyeing is conducted may be varied depending upon the particular material undergoing coloration. It is understood by those skilled in the art of dyeing that the intensity of dyeing may be varied by varying the proportion of dye to material undergoing coloration. The amount of dye used can be, for example, ½% to 3% by weight of that of the textile material, although lesser or greater amounts of dye can be used.

In the following examples which are offered to illustrate the present invention and are not to be deemed limitative thereof, unless otherwise indicated, parts means parts by weight.

*Example 1*

Preparation of the dye:

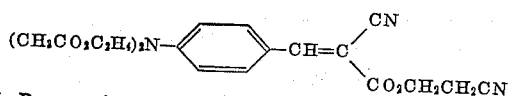

I. Preparation of intermediates:
A. $\beta,\beta'$-phenylimino-bis-ethyl acetate:

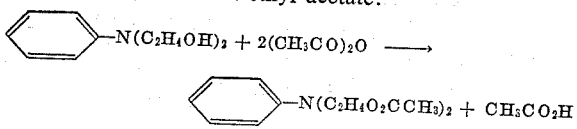

In a 300 ml., round-bottomed flask are placed 45 parts of $\beta,\beta'$-phenylimino bis-ethanol and 50 parts of acetic anhydride. The reaction mixture is heated under reflux for 2 hours; the excess acetic anhydride and generated acetic acid are removed under reduced pressure and the residue distilled. There is obtained about 50 parts of a light pale yellow oil, boiling point 148–9°/0.15 mm., identified as the diacetate derivative.

Calculated for $C_{14}H_{19}O_4N$: nitrogen, 5.28. Found: nitrogen, 5.20.

B. $\beta,\beta'$-(4-formylphenyl)-imino-bis-ethyl acetate:

In a 500 ml., three-necked, round-bottomed flask containing 100 parts undistilled $\beta,\beta'$-phenylimino-bis-ethyl acetate derived as described above and 73 parts of dimethyl formamide, there is added dropwise over a period of 30 minutes at 10–20°, 153 parts of phosphorus oxychloride with stirring. After the addition, the reaction mixture is warmed on a steam bath for one hour (90–100°) and allowed to stir at room temperature overnight. The viscous reaction mixture is drowned in 400 ml. of ice water. With the temperature being maintained below 20°, there is gradually added 370 ml. of 40% sodium hydroxide solution (final mixture pH 4–6). The resulting heavy, pale yellow oil is extracted with several portions of chloroform. The combined extracts are dried, and the solvent removed. The residue is distilled, and the product is collected at 193–5° at 0.08 mm. The yield for the combined steps of acetylation and formylation is 48% of theory.

Calculated for $C_{15}H_{19}O_5N$: carbon, 61.73; hydrogen, 6.52. Found: carbon, 61.50; hydrogen, 6.67.

II. Condensation to form methine compound:

29 parts of crude $\beta,\beta'$-(4-formylphenyl)imino-bis-ethyl acetate contained in 60 ml. chloroform is combined with 14 parts of cyanoethyl cyanoacetate and 5 drops of piperidine is added as a catalyst. The mixture is heated under reflux for 30 minutes, after which the chloroform is removed by distillation and replaced with methanol.

Upon cooling and scratching, crystallization is induced. There is obtained 14.5 parts of a green-yellow solid melting at 90–4°. Since crude intermediates have been used in this three-step synthesis, the overall three-step yield is only 38% of theory.

*Example 2*

Preparation of the dye:

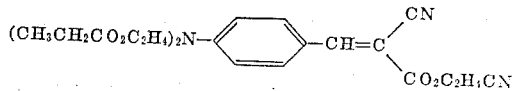

I. Preparation of intermediates:
A. $\beta,\beta'$-phenylimino-bis-ethyl propionate:

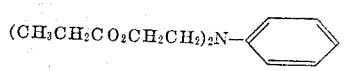

In a suitable vessel are combined 181 parts of $\beta,\beta'$-phenylimino-bis-ethanol and 186 parts of propionic anhydride. After heating on a steam bath for 2 hours the generated acid and excess anhydride are removed and the residue distilled under reduced pressure. There is obtained 265.5 g. of a product boiling at 146–8° at 0.1 mm., and having the above structure (91% of theory).

B. $\beta,\beta'$-(4-formylphenyl)-imino-bis-ethyl propionate:

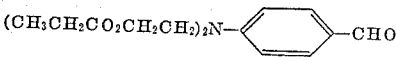

In a suitable vessel are combined 146 parts of $\beta,\beta'$-phenylimino-bis-ethyl propionate and 55 parts of dimethyl formamide. With the temperature maintained at 10–20° C., there is added dropwise during the course of 35 minutes 94 parts of phosphorus oxychloride. The reaction mixture is allowed to stir at room temperature for 1 hour (temperature increased to 37° C.) and then warmed on a steam bath for 1 hour (90–100°). After cooling for 1 hour, the reaction mixture is drowned in ice and water and processed as described in Example 1, part B. An aliquot portion is distilled under reduced pressure. There is obtained a heavy amber-colored oil boiling at 201–2° at 0.07 mm. The yield is 80% of theory.

Calculated for $C_{17}H_{23}O_5N$: carbon, 63.5; hydrogen, 7.17; nitrogen, 4.36. Found: carbon, 63.5; hydrogen, 6.99; nitrogen, 4.55.

II. Condensation to form methine compound:

Cyanothethyl α-cyano-4-di-(β-propionoxyethyl)-amino cinnamate:

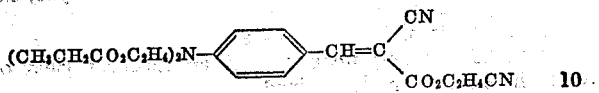

About 32 parts of crude β,β'-(4-formylphenyl)-imino bis-ethyl propionate contained in about 50 ml. of chloroform is combined with 14 ml. of cyanoethyl cyanoacetate and 10 drops of piperidine is added as catalyst. The reaction mixture is heated under reflux for 30 minutes, the chloroform removed by distillation and the residue crystallized from 200 ml. of 2-propanol. There is obtained 35.5 g. of a green-yellow solid; melting point 89–91°. Since crude starting material has been used in this preparation, the yield of 83% represents the yield for the two steps—formylation and condensation.

Example 3

Preparation of the dye:

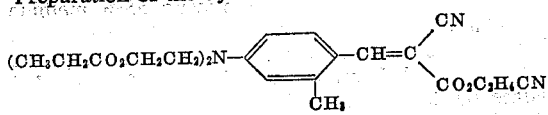

I. Preparation of intermediates:

A. β,β'-(m-tolyl)iminobis-ethyl propionate:

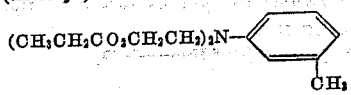

In a suitable reaction vessel there are combined 195 parts of dioxyethyl-m-toluidine and 325 parts of propionic anhydride. The reaction is carried out and worked up as in Example 2, part A. There is obtained 281 parts of product of above structure boiling at 147–9° at 0.2 mm. (94.5% yield).

B. β,β'-(3-methyl-4-formylphenyl)-iminobis-ethyl propionate:

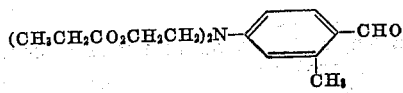

In a suitable reaction vessel are combined 148.5 parts of β,β'-m-tolylimino bis-ethyl propionate and 44 parts of dimethyl formamide. During 40 minutes there is added dropwise 56 parts of phosphorus oxychloride. The exothermic reaction is maintained at 20–30° by means of external cooling. After the addition, the mixture is stirred 1 hour at room temperature and for 1 hour on a steam bath. After cooling, the viscous mass is drowned in 500 ml. of an ice-water mixture. There is gradually added 188 ml. of 40% sodium hydroxide to neutralize the acids resulting from the hydrolysis of the phosphorus oxychlorides and their amine complexes. The final mixture has a hydrogen ion concentration of pH 3–6. The resulting oily product is extracted with chloroform. The combined extracts are washed and dried. The product is not further purified.

II. Condensation to form methine compound:

Cyanoethyl α - cyano - 2 - methyl - 4 - di - (β - propionoxyethyl)-amino cinnamate:

About 32.5 parts of crude aldehyde from Example 3, Part B (above) contained in chloroform, 13 parts of cyanoethyl cyanoacetate, and 5 drops of piperidine are heated under reflux for 30 minutes. The chloroform is removed and the residue crystallized from 250 ml. of 2-propanol. There is obtained 35.5 parts of a bright, green-yellow solid melting at 122–4°. Based on the two steps, formylation and condensation, the yield is 80% of the theoretical.

Example 4

Preparation of the dye:

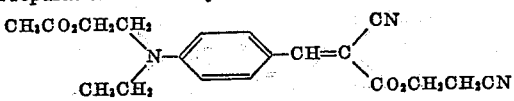

I. Preparation of intermediate:

N-ethyl-β-(4-formylphenyl)-amino ethyl acetate:

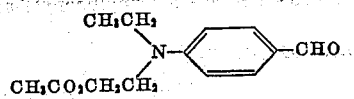

In a suitable reaction vessel are combined 82.5 parts of N-ethyl-β-phenylamino ethanol and 61 parts of acetic anhydride. After warming on a steam bath for two hours, the generated acetic acid and excess anhydride are removed under reduced pressure. To the residue is added 44 parts of dimethyl formamide. To this well stirred mixture at 10–20° is added dropwise 93 parts of phosphorus oxychloride. After the addition the reaction mixture is heated on a steam bath for two hours (90–100°), allowed to cool to 40° and then drowned in an excess of ice and water. With the temperature being maintained at 5–15°, there is added portionwise 220 ml. of 40% sodium hydroxide in a final pH of 4–6. The resulting oil is extracted with chloroform. The combined extracts are washed acid free and dried, the solvent removed, and the residue distilled under reduced pressure. There is obtained 75.5 parts of product boiling at 163° at 0.4 mm. The combined yield for the two steps—acetylation and formylation— amounts to 64% of theory.

Calculated for $C_{13}H_{17}O_3N$: carbon, 66.3; hydrogen, 7.3; nitrogen, 5.95. Found: carbon, 66.5; hydrogen, 7.23; nitrogen, 5.94.

II. Condensation to form methine compound:

About 11.85 parts of the appropriate pure aldehyde, 6.5 parts of cyanoethyl cyanoacetate, and 5 drops of piperidine are combined with 60 ml. of 2-propanol. The mixture is heated for several minutes and upon cooling the green-yellow solid product separates. There is obtained 12 parts of dye; melting point 71–6° (70% of theory).

Example 5

Preparation of the dye:

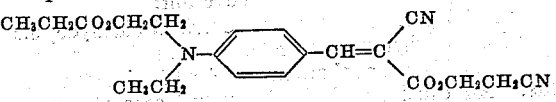

I. Preparation of intermediate:

N-ethyl-β-(4-formylphenyl)-aminoethyl propionate:

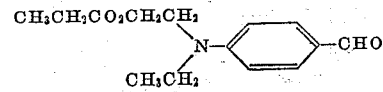

About 82.5 parts of N-ethyl-β-phenylamino ethanol is acylated with 78 parts of propionic anhydride as detailed in Example 4. Without isolation and purification of this acylated material, it is formylated by means of dimethyl formamide and phosphorus oxychloride as in Example 4. There is obtained 82.5 parts of product; boiling point 166° at 0.4 mm. The two-step yield—for acylation and formylation—is 66% of theory.

Calculated for $C_{14}H_{19}O_3N$: carbon, 67.3; hydrogen, 7.61; nitrogen, 5.62. Found: carbon, 67.47; hydrogen, 7.41; nitrogen, 5.41.

II. Condensation to form methine compound:

About 12.5 parts of pure propionate aldehyde, 6.5 parts of cyanoethyl cyanoacetate, 5 drops of piperidine, and 40 ml. of 2-propanol are combined and heated under reflux for several minutes. Upon cooling the green-yellow product separates. There is obtained 12 parts of product; melting point 64–8° (66% of theory).

Example 6

Preparation of the dye:

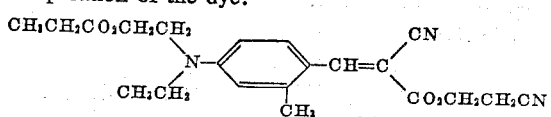

I. Preparation of intermediate:

N-ethyl - β - (3 - methyl - 4-formylphenyl)-aminoethyl propionate:

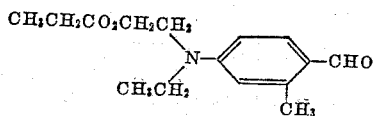

About 90 parts of N-ethyl-β-(m-tolyl)-aminoethyl alcohol and 78 parts of propionic anhydride are combined and caused to react as detailed in Example 4. Without isolation of this acylated material, it is formulated by means of dimethyl formamide and phosphorus oxychloride as in Example 4. No attempt is made to purify this liquid product. The crude aldehyde condenses readily with ethyl cyanoacetate under the usual conditions to yield a solid methine derivative; melting point 77–8°.

II. Condensation to form methine compound:

About 26.3 parts of crude acylated aldehyde from I above, 14 parts of cyanoethyl cyanoacetate, 10 drops of piperidine, and 50 ml. of chloroform are heated under reflux for 30 minutes. The chloroform is removed and the residue crystallized from 500 ml. of 2-propanol. There is obtained 30.8 parts of a bright green-yellow solid; melting point 78–80°. The yield of 81% represents the conversion for three steps—acylation, formylation, and condensation.

Example 7

Preparation of the dye:

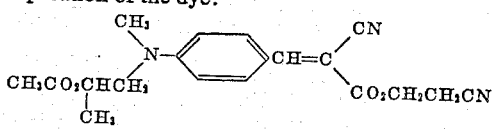

I. The intermediate aldehyde (N-methyl)-N-(4-formylphenyl)-aminoisopropyl acetate, is prepared in the manner disclosed in my copending application Serial No. 372,400, filed August 4, 1953.

II. Condensation to the methine dyestuff:

About 11.9 parts of the above described aldehyde, 6.5 parts of cyanoethyl cyanoacetate, 1 part sodium acetate and 50 ml. of 2-propanol are heated for 30 minutes under reflux. An excellent yield of dyestuff separates upon cooling.

Example 8

Preparation of the dye:

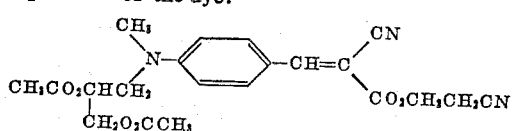

I. The intermediate aldehyde, 3-(N-methyl)-N-(4-formylphenyl)-aminopropanediol diacetate-1,2, is prepared in the manner described in the aforementionad copending application Serial No. 372,400.

II. Condensation to the methine dyestuff:

About 15.0 parts of the above described aldehyde, 6.5 parts cyanoethyl cyanoacetate, 1 part piperidine, and 50 parts chloroform are heated under reflux for 20 minutes whereby an excellent yield of the dyestuff is obtained.

Example 9

Preparation of the dye:

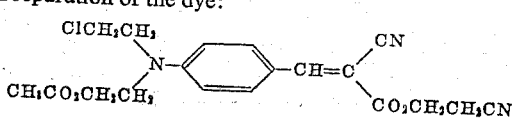

I. The intermediate aldehyde, 2-N-(β-chloroethyl)-N-(4-formylphenyl)-aminoethylacetate, is prepared in the manner described in my aforementioned application Serial No. 372,400.

II. Condensation to the methine dyestuff:

About 13.5 parts of the above described aldehyde, 6.5 parts cyanoethyl cyanoacetate, 1 part sodium bicarbonate and 50 parts of 2-propanol are heated under reflux for about 25 minutes; upon cooling an excellent yield of methine compound is obtained.

Example B 0.2 g. of a dye composition comprising 55% dyestuff of Example 3, 37% sodium lignin sulfonate and 8% sodium sulfate is dispersed in 250 ml. of water.

A 10 g. piece of cellulose acetate cloth is immersed in the above described dyebath at a temperature of 120° F., the temperature is then raised to 190° F. and held there for 1 hour, after which the cloth is removed, rinsed and dried. The resultant dyed cloth exhibits outstanding levelness of dyeing and has excellent light- and wash-fastness.

Example C

A composition is prepared employing 55% methine dye similar to that of Example 3 in that the aldehyde moiety is the same but the active methylene compound employed is methyl cyanoacetate instead of cyanoethyl cyanoacetate, 37% sodium lignin sulfonate and 8% sodium sulfate. 0.2 g. of this composition is dispersed in water and a 10 g. piece of cellulose acetate cloth is dyed in a manner identical to that described in Example B. The resultant dyed cloth has about one-half the tinctorial strength of the dyed cloth of Example B.

Example D

The dyeing procedure of Example B is repeated utilizing as the dye composition the following:

50% dyestuff of Example 4
40% sodium N-methyl, N-oleolyl taurate
10% sodium sulfate 0.2 g. of this composition is dispersed in 300 ml. water and the dyeing of the acetate cloth is conducted as in Example B. The results are comparable to those obtained in Example B. As far as tinctorial strength is concerned, this dyed product has about 50% greater depth of color than the dyed product of Example E.

Example E

A composition similar to that of Example D is prepared except that the dye is that of Example C. Example D is then repeated in its procedure for preparing the dyebath and dyeing the acetate cloth. As described in Example D, the tinctorial strength of the dyed cloth is greatly inferior to that of Example D.

Example F

Example D is repeated except that the dyestuff employed is the one of Example 5 instead of Example 4. Again the results are excellent and the dyed product has, again, about 50% greater depth of color than the dyed product of Example E.

Example G

Example D is repeated using, however, as the methine compound that of Example 6 in lieu of the compound of Example 4. The dyed fabric exhibits excellent wash- and light-fastness and the tinctorial strength is at least 58% greater than the dyeing of Example E.

This invention has been disclosed with respect to certain prepared embodiments. Various modifications and variations of these embodiments will become apparent to those skilled in the art, and it is to be understood that such modifications and variations are to be included within the spirit and purview of this application and the scope of the appended claims.

I claim:
1. Compounds of the following general formula:

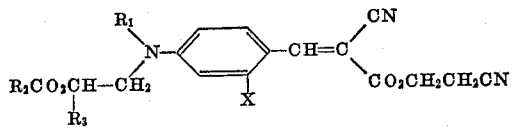

wherein $R_1$ is a radical selected from the group consisting of aralkyl, alkyl radicals of 1 to 6 carbon atoms and hydroxy chloro, cyano, and alkoxy substituted derivatives thereof, and the grouping

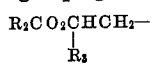

wherein $R_2$ is a lower alkyl radical, $R_3$ is selected from the group consisting of hydrogen, lower alkyl, and acyloxymethyl and X is selected from the group consisting of hydrogen and lower alkyl.

2.

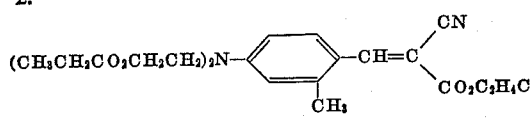

3.

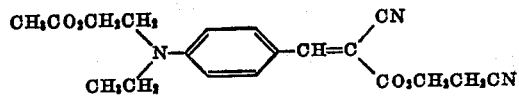

4.

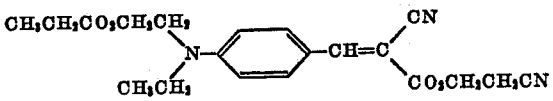

5.

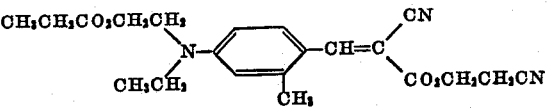

6.

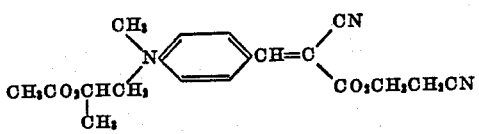

References Cited in the file of this patent
UNITED STATES PATENTS

| | | |
|---|---|---|
| 2,374,880 | Mueller | May 1, 1945 |
| 2,583,614 | Taylor et al. | Jan. 29, 1952 |
| 2,649,471 | Williams et al. | Aug. 18, 1953 |
| 2,766,233 | Kartinos et al. | Oct. 9, 1956 |